US006867429B1

(12) United States Patent
Lutz

(10) Patent No.: US 6,867,429 B1
(45) Date of Patent: Mar. 15, 2005

(54) ARRANGEMENTS OF MICROSCOPIC PARTICLES FOR PERFORMING LOGIC COMPUTATIONS, AND METHOD OF USE

(75) Inventor: Christopher Paul Lutz, Felton, CA (US)

(73) Assignee: International Business Machines Corporation, Armonk, NY (US)

( * ) Notice: Subject to any disclaimer, the term of this patent is extended or adjusted under 35 U.S.C. 154(b) by 46 days.

(21) Appl. No.: 10/687,782

(22) Filed: Oct. 17, 2003

Related U.S. Application Data

(62) Division of application No. 10/256,496, filed on Sep. 26, 2002, now Pat. No. 6,682,951.

(51) Int. Cl.[7] .......................... H01L 35/24; H01L 51/00
(52) U.S. Cl. ....................................................... 257/40
(58) Field of Search .......................... 257/40; 438/82–99

(56) References Cited

U.S. PATENT DOCUMENTS

| | | | |
|---|---|---|---|
| 4,987,312 A | 1/1991 | Eigler | |
| 5,144,148 A | 9/1992 | Eigler | |
| 5,166,919 A | 11/1992 | Eigler | |
| 5,323,376 A | 6/1994 | Eigler | |
| 6,307,147 B1 | 10/2001 | Bird et al. | |
| 6,339,227 B1 | 1/2002 | Ellenbogen | |
| 6,348,700 B1 | 2/2002 | Ellenbogen et al. | |
| 6,472,248 B2 | 10/2002 | Shiozaki et al. | |
| 6,621,100 B2 | 9/2003 | Epstein et al. | |

OTHER PUBLICATIONS

R. P. Cowburn et al., "Room Temperature Magnetic Quantum Cellular Automata", Science, vol. 287, Feb. 25, 2000, pp. 1466–1468.

I. Amiani et al., "Digital Logic Gate Using Quantum–Dot Cellular Automata", Science, vol. 284, Apr. 9, 1999, pp. 289–291.

C. P. Collier et al., "Electronically Configurable Molecular–Based Logic Gates", Science, vol. 285, Jul. 16, 1999, pp. 391–394.

D. M. Eigler et al., "Positioning single atoms with a scanning tunnelling microscope", Nature, vol. 344, Apr. 5, 1990, pp. 524–526.

L. Bartels et al., "The evolution of CO adsorption on Cu(111) as studied with bare and CO–functionalized scanning tunneling tips", Elsevier Science B. V., vol. 432, 1999, pp. 621–626.

R. Landauer, "Advanced Technology and Truth in Advertising", Elsevier Science B. V. (North Holland), Physica A, vol. 168, 1990, pp. 75–87.

J. Timler et al., "Power gain and dissipation in quantum–dot cellular automata", Journal of Applied Physics, vol. 91, No. 2, Jan. 15, 2002, pp. 823–831.

Y. Okawa et al., "Linear chain polymerization initialed by a scanning tunneling microscope tip at designated positions", Journal of Chemical Physics, vol. 115, No. 5, Aug. 1, 2001, pp. 2317–2322.

(List continued on next page.)

*Primary Examiner*—Cuong Nguyen
(74) *Attorney, Agent, or Firm*—Daniel E. Johnson

(57) ABSTRACT

An array of discrete, microscopic particles in a substantially fixed spatial relationship with respect to each other is constructed by using an STM to position CO molecules on the (111) surface of a copper crystal. The particles of the array are arranged so that the array performs a logic operation (such as AND and OR) when input to the array is provided. This input takes the form of moving one or more of the particles, thereby triggering a cascade of motion through the array, which leads to output from the array. More generally, the array may be used to propagate motion by sequentially inducing movement of particles in the array.

21 Claims, 6 Drawing Sheets

OTHER PUBLICATIONS

D. M. Eigler et al., "An atomic switch realized with the scanning tunnelling microscope", Nature, vol. 352, Aug. 15, 1991, pp. 600–603.

K. E. Drexler, "Nanosystems Molecular Machinery, Manufacturing, and Computation", A Wiley–Interscience publication, 1992, pp. 342–371.

Saraf et al., "Self assembled nano–devices using DNA", U.S. Patent Application Publication No. US 2002–0098500 A1, Jul. 25, 2002, Appl. No. 09/972,958.

"Molecular Abacus The World's Smallest Abacus", as presented on the web at http://www.chem.ucla.edu/dept/Faculty/gimzewski/id4.htm, 4 page article dated No. 13, 1996.

ARRANGEMENTS OF MICROSCOPIC PARTICLES FOR PERFORMING LOGIC COMPUTATIONS, AND METHOD OF USE

This application is a divisional of U.S. application Ser. No. 10/256,496 titled "Arrangements of microscopic particles for performing logic computations, and method of use", filed Sep. 26, 2002, now U.S. Pat. No. 6,682,951 the disclosure of which is hereby incorporated by reference in its entirety.

TECHNICAL FIELD

The invention is in the field of physics of computation. More particularly, the invention relates to the ability to use microscopic particles, especially in a mechanical way, to perform calculations.

BACKGROUND

The silicon transistor technology on which modern computation is based has shown rapid exponential improvement in speed and integration for more than four decades. It is widely expected that this rate of improvement will slow as device dimensions approach the nanometer scale (see J. D. Meindl et al., "Limits on silicon nanoelectronics for terascale integration", *Science* 293, pp. 2044–2049, 2001). This has led to the exploration of many alternative computation schemes, most of which are based on gating the flow of electrons by novel means such as quantum dots (see D. Goldhaber-Gordon et al., "Overview of nanoelectronic devices", *Proc. IEEE* 85, pp. 521–540, 1997), organic molecules (see G. Y. Tseng et al., "Toward nanocomputers", *Science* 294, pp. 1293–1294, 2001), carbon nanotubes (see S. J. Wind et al., "Vertical scaling of carbon nanotube field-effect transistors using top gate electrodes", *Appl. Phys. Lett.* 80, pp. 3817–3819, 2002), and the motion of single atoms or molecules (see Y. Huang et al., "Logic gates and computation from assembled nanowire building blocks", *Science* 294, pp. 1313–1317, 2001). Other proposals include electrons confined in quantum dot cellular automata (see C. S. Lent et al., "A device architecture for computing with quantum dots", *Proc. IEEE* 85, pp. 541–557, 1997; and I. Amlani et al., "Digital logic gate using quantum-dot cellular automata", *Science* 284, pp. 289–291, 1999), magnetic dot cellular automata (see R. P. Cowburn et al., "Room temperature magnetic quantum cellular automata", *Science* 287, pp. 1466–1468, 2000), and solutions of interacting DNA molecules (see R. S. Braich et al., "Solution of a 20-variable 3-SAT problem on a DNA computer", *Science* 296, pp. 499–502, 2002).

Computation can also be achieved using purely mechanical means (see D. D. Swade et al., "Redeeming Charles Babbage's mechanical computer", *Scientific American*, pp. 86–91, February 1993; and K. E. Drexler et al., *Nanosystems*, John Wiley & Sons, New York, 1992). It has been widely assumed that mechanical devices will always be too large to be competitive with electronic computational devices. Atomic scale mechanical devices capable of performing logic computations would, however, be of interest to the computational technology community.

SUMMARY OF THE INVENTION

Preferred embodiments and implementations of the invention involve a type of mechanical computation in which the moving parts are single molecules bound to a surface. A molecule moves or "hops" on the surface from a site of higher potential energy to an adjacent site of lower potential energy, with this movement being controlled by chemical interactions with nearby molecules. This movement may be viewed as being analogous in some respects to the toppling of rows and/or columns of standing dominoes, in which the motion of a molecule to a lower-energy position corresponds to the toppling of a domino.

Moving a single molecule in a row of molecules causes others to move or "topple" sequentially, so that a single bit of information can be transported from one location to another, with the toppled and untoppled states representing binary 0 and 1, for example. In addition, the molecules described herein may be arranged in patterns that perform logic operations. For example, an OR gate is implemented by a molecule that is toppled as a result of an interaction with either one of two arriving molecule cascades. An AND gate, on the other hand, is implemented by a molecule that is toppled as a result of an interaction with two arriving molecule cascades. One side-effect of moving a molecule from a position of higher potential energy to one of lower potential energy is that energy is dissipated in the process, thereby producing heat to be removed later. Thus, it is advantageous to use the least difference in potential energy sufficient to give the desired speed of the cascade, provided the activation energy (the potential energy barrier against motion from the initial position) is not so small that the initial configuration has an unacceptable probability of undergoing spontaneous decay, i.e., motion to the lower energy position.

One preferred embodiment of the invention is an array of discrete, microscopic particles that are initially in a substantially fixed spatial relationship with respect to each other and with respect to a matrix that acts as a host material for holding the particles. Each of the particles in the array includes at least one atom (either neutral or charged), and the array includes at least first, second, and third ones of the particles. The particles are arranged to perform a logic computation, so that in response to at least one of the first and the second particles being urged into a lower potential energy state, movement of the third particle is induced as a result of at least one of i) physical interaction between the first particle and the third particle and ii) physical interaction between the second particle and the third particle. The array may form an AND gate, in which case movement of the third particle is induced as a result of i) physical interaction between the first particle and the third particle and ii) physical interaction between the second particle and the third particle. Alternatively, the array may form an OR gate. The array may be tailored to longer cascade lengths by including additional particles; fourth and fifth particles may be included in the array, such that movement of the first particle is induced as a result of moving a fourth particle in the array (in which the fourth particle physically interacts with the first particle), and such that movement of the second particle is induced as a result of moving a fifth particle in the array (in which the fifth particle physically interacts with the second particle). In a preferred embodiment, the particles are molecules arranged on a surface of the matrix. Additional particles may be included in the array to increase the rate at which the cascade of motion propagates through the array, e.g., the presence of such additional particles acts to induce movement of the third particle more quickly than would occur in the absence of the additional particles.

One preferred implementation of the invention is a method of propagating motion through an array of microscopic particles that are initially in a substantially fixed spatial relationship with respect to each other and with respect to a matrix that acts as a host material for holding the particles, in which each of the particles includes at least one atom. The method includes selecting a first one of the particles, and moving the first particle, so that (i) movement of a second particle that is in proximity with the first particle is induced as a result of physical interaction between the first particle and the second particle, and (ii) movement of a third particle that is in proximity with the second particle is induced as a result of physical interaction between the second particle and the third particle. The method further includes sequentially inducing movement of other particles in the array in a similar fashion, so that motion propagates through the array, in which the propagation of motion represents information. In a preferred implementation, the movement includes translational movement of particles across a surface of the matrix, and the second particle is adjacent to the first particle. In preferred implementations of the method, not all of the particles move as the cascade of motion propagates through the array.

Another preferred implementation of the invention is a method of propagating motion through an array of microscopic particles that are initially in a substantially fixed spatial relationship with respect to each other and with respect to a matrix that acts as a host material for holding the particles, in which each of the particles includes at least one atom. The method includes selecting a first one of the particles, and moving the first particle, so that (i) movement of a second particle that is in proximity with the first particle is induced as a result of physical interaction between the first particle and the second particle, and (ii) movement of a third particle that is in proximity with the second particle is induced as a result of physical interaction between the second particle and the third particle. The method further includes sequentially inducing movement of other particles in the array in a similar fashion, without inducing movement of all the particles in the array, so that motion propagates through the array, in such a way that the chemical structure of the particles remains unaltered during the propagation. In a preferred implementation, the movement includes translational movement of particles across a surface of the matrix, and the second particle is adjacent to the first particle. In preferred implementations of the method, the propagation of motion represents information.

Yet another preferred implementation of the invention is a method of performing logic computations that includes providing an array of discrete microscopic particles, each of which includes at least one atom, with the array including at least first, second, and third ones of the particles. The method includes moving at least one of the first and second particles, and inducing movement in the third particle as a result of at least one of i) physical interaction between the first particle and the third particle and ii) physical interaction between the second particle and the third particle, in which the third particle is urged into a lower potential energy state, and in which movement of the third particle represents output of a logic computation. The array of discrete particles may form an AND gate, in which case the method includes moving the first particle (thereby urging the first particle into a lower potential energy state), and moving the second particle (thereby urging the second particle into a lower potential energy state), in which movement of the third particle is induced as a result of i) physical interaction between the first particle and the third particle and ii) physical interaction between the second particle and the third particle. Alternatively, the array of discrete particles may form an OR gate. In a preferred implementation of the method, the particles hop from one site on a surface of the matrix to an adjacent site on the surface.

DETAILED DESCRIPTION OF THE INVENTION

Figure 1A:
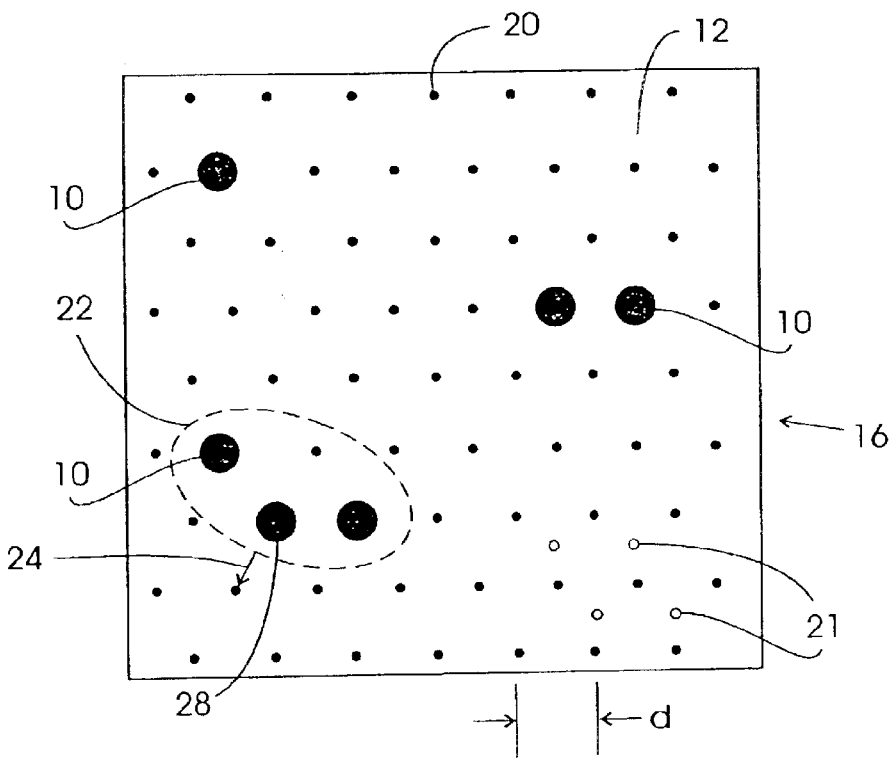
FIGS. 1A and 1B are schematics of molecules arranged on the surface of a crystal, including a trimer that undergoes a decay between FIGS. 1A and 1B.

FIG. 1A schematically shows some arrangements of microscopic particles 10 (such as molecules) physically connected to a matrix that acts as a host material for holding the particles, e.g., the particles may be disposed on the surface 12 of a crystal 16. In general, a particle 10 may be a single atom, a multi-atom molecule, part of a molecule, a cluster of molecules that move in concert, or any nanometer-scale object; the particles 10 may be neutral or ionic and may contain permanent or induced electric or magnetic dipoles. For the results presented here, the particles 10 were carbon monoxide ("CO"), and the crystal 16 was copper, specifically, the (111) surface of copper. The Cu(111) crystal 16 was prepared by Ar-ion sputtering and annealing to 600° C. The CO molecules 10 were adsorbed onto the surface 12 of the Cu crystal by admitting CO gas with the crystal held at 15 K (see Bartels et al., "The evolution of CO adsorption on Cu(111) as studied with bare and CO-functionalized scanning tunnelling tips", Surf Sci. Lett. 432, L621–L626, 1999).

After being adsorbed onto the surface 12, the molecules 10 themselves were positioned at various lattice sites 20 on the surface using an ultra high vacuum scanning tunneling microscope (or "STM", not shown) at 5 Kelvin (K). The results presented herein were also made at this temperature. Representative locations of second layer copper atoms are indicated in FIG. 1A by the symbols designated by the numeral 21. It is to be understood that the second layer extends continuously below the surface 12. In the other figures herein, the second layer is not shown for clarity.

The STM had a tip made of polycrystalline iridium. STM images were typically acquired using a junction voltage of 10 mV and tunnel currents of 0.1–1 nA. The CO molecules 10 were moved across the surface 12 by decreasing the tunnel-junction resistance to ~250 kΩ, thereby bringing the STM tip sufficiently close to a CO molecule 10 to pull it across the surface. (See D. M. Eigler et al., "Positioning single atoms with a scanning tunnelling microscope", Nature 344, pp. 524–526, 1990. Further details regarding the positioning of atomic size particles on a surface using an STM are disclosed in U.S. Pat. Nos. 4,987,312 and 5,144,148 to Eigler titled "Process for repositioning atoms on a surface using a scanning tunneling microscope", both of which are incorporated by reference.)

While it was not possible to resolve individual Cu atoms residing on the surface 12 under these imaging conditions, the positions of the Cu lattice sites 20 can be deduced from the positions of the CO molecules 10, since it is known that a CO molecule will bind atop a surface Cu atom, standing upright with the carbon atom down. An isolated CO molecule (such as the one shown in the upper left hand corner of FIG. 1A) images as an azimuthally symmetric dip typically 0.05 nm deep. A dimer and a trimer of CO are also schematically represented in FIG. 1A (on the right hand side and lower left hand sides, respectively). The STM image (not shown) corresponding to FIG. 1A shows a bright area directly between nearest-neighbor molecules where there is a peak in the local density of states. The dimer and trimer are loosely bound in the sense that the CO molecules 10 within them can be easily separated from each other with the STM tip.

Figure 1B:
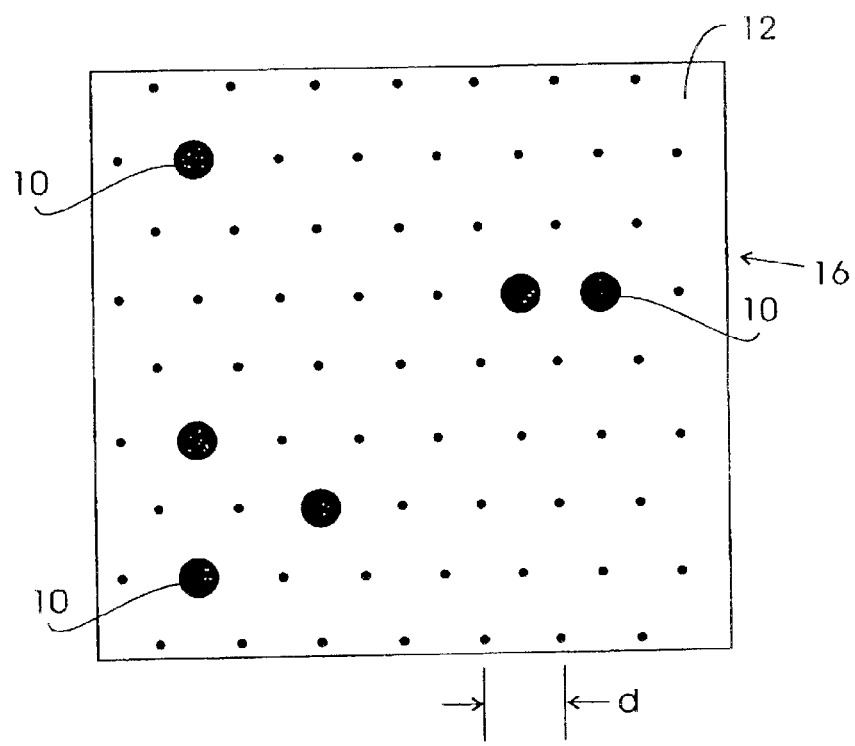

The CO dimer is stable at 5 K. On the other hand, the CO trimer 22 shown in FIG. 1A is stable enough to be imaged, but decays spontaneously after a few minutes as indicated by the arrow 24, which indicates a "hop" of the trimer's central molecule 28 from one site 20 on the surface 12 to another site. The result is that the trimer 22 dissipates energy by decaying into three CO molecules 10 separated from each other, as shown in FIG. 1B. The CO trimer 22 in FIG. 1A (defined by the molecule 28 and the two molecules adjacent to it) forms a bent-line arrangement referred to herein as a "chevron". Chevrons 22 decay only as indicated by the arrow 24, but the rate of decay is highly dependent on the presence and arrangement of any nearby CO molecules. After the chevron 22 has decayed (FIG. 1B), the molecules 10 are separated by a distance of $\sqrt{3}$ d, where d represents the distance between lattice sites designated in FIGS. 1A and 1B (which is about 0.255 nm). This arrangement appears to be a low-energy spacing based on the $\sqrt{3} \times \sqrt{3} R30°$ island formation observed at higher temperatures, as discussed by Bartels et al., supra. The hopping rate and physical mechanism behind this phenomenon can be qualitatively explained as follows. Quantum tunneling of an entire CO molecule 10 occurs primarily from the ground state of the molecule in its initial potential well when $T \leq 7$ K, and primarily from one or more vibrationally excited states of the molecule when $T \geq 7$ K. Thus, the hopping rate is roughly constant below 7 K, and increases rapidly with temperature above 7 K. The cascading behavior illustrated by the various figures herein was established through the use of STM images.

Figure 2:
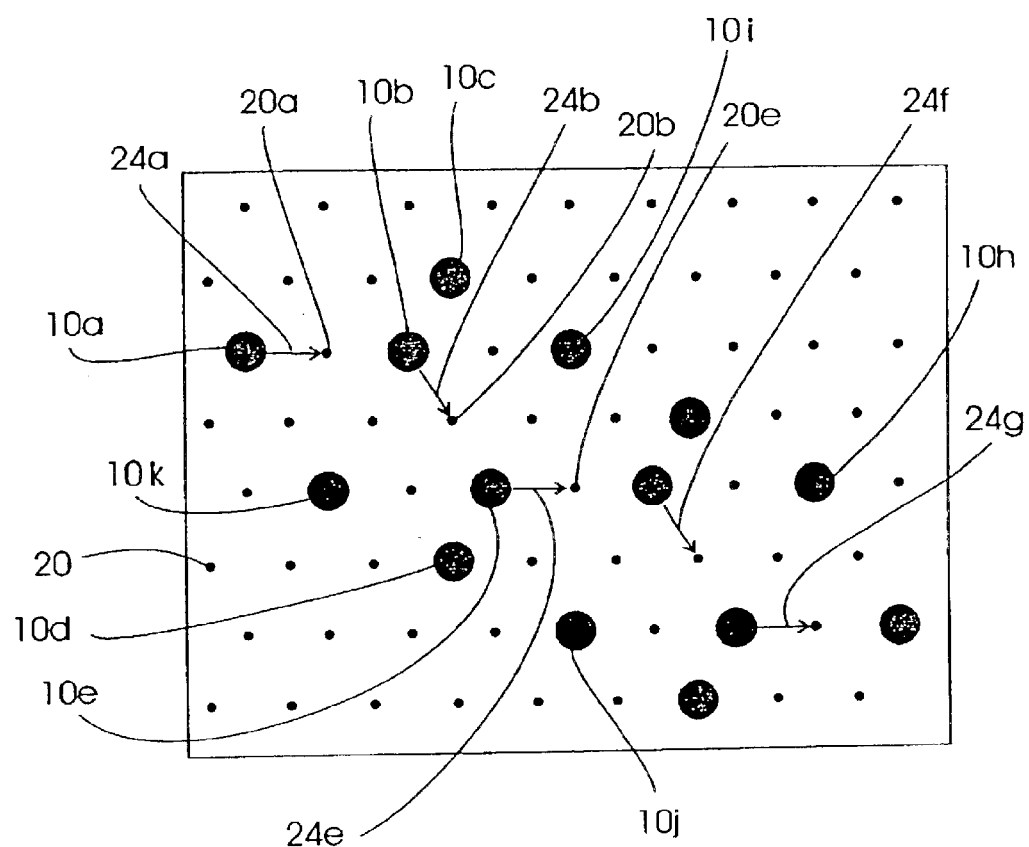
FIG. 2 is a schematic of a molecular arrangement that demonstrates the progression of a cascade.

FIG. 2 shows how the CO molecules may be arranged so that the formation and subsequent decay of a first chevron leads to the formation and subsequent decay of another chevron. In particular, a first CO molecule 10a is moved (e.g., with the tip of an STM) in the direction indicated by the arrow 24a from one site towards a neighboring site 20a. (As used herein, "moved", "moving", and "movement" refer to motion of one or more particles 10 with respect to the matrix, e.g., the crystal 16.) After the molecule 10a arrives at its new site 20a, it forms part of a newly formed chevron defined by molecules 10a, 10b, and 10c. This chevron in turn decays through a hop of the molecule 10b towards site 20b, as indicated by the arrow 24b. This results in the formation of a chevron defined by the molecules 10b, 10d, and 10e. The molecule 10e then hops to a new site 20e, as indicated by the arrow 24e. This process is repeated as additional chevrons are formed, resulting in further cascading behavior as indicated by the arrows 24f and 24g. In principle, this cascade can be tailored to any desired length. This "linked-chevron" cascade propagates forward reliably because the energy of the system is lowered each time a molecule 10 hops to a new site 20 on the surface 12 of the crystal 16. If the energy of the system were not lowered with each hop, one would expect to observe hops going backward (toward the initial state) as often as forward. In the linked-chevron cascade of FIG. 2, only "forward hops" are observed, although backward hopping behavior is occasionally observed in the "crossover" configuration described below. In general, there is no lower limit to the average energy that must be dissipated with each hop. However, as this energy drops below the thermal energy, backwards hops become common and the propagation time increases.

The configuration shown in FIG. 2 also includes molecules $10h$, $10i$, $10j$, $10k$ that speed up the rate at which the cascade proceeds; these molecules do not participate in dimer formation in the initial configuration, nor do they become part of a chevron as the cascade propagates. Nevertheless, locating CO molecules at a distance $\sqrt{3}$ d from the sites to which the CO molecules move has the effect of increasing the hopping rate ~100-fold, which is consistent with the observation that the $\sqrt{3}$ spacing is apparently a low energy configuration.

A molecule cascade such as the one described here may be viewed as a "wire" across which one bit of information is communicated over the surface 12 of the crystal 16. That is to say, a molecule 10 in its initial or final position may represent binary 0 or 1, respectively. Unlike a conventional wire, however, a cascade exhibits digital signal restoration, which is an essential part of digital computation that is conventionally provided by logic gates or explicit buffers (see, for example, R. Landauer, "Advanced technology and truth in advertising", *Physica A* 168, pp. 75–87, 1990).

Figure 3:
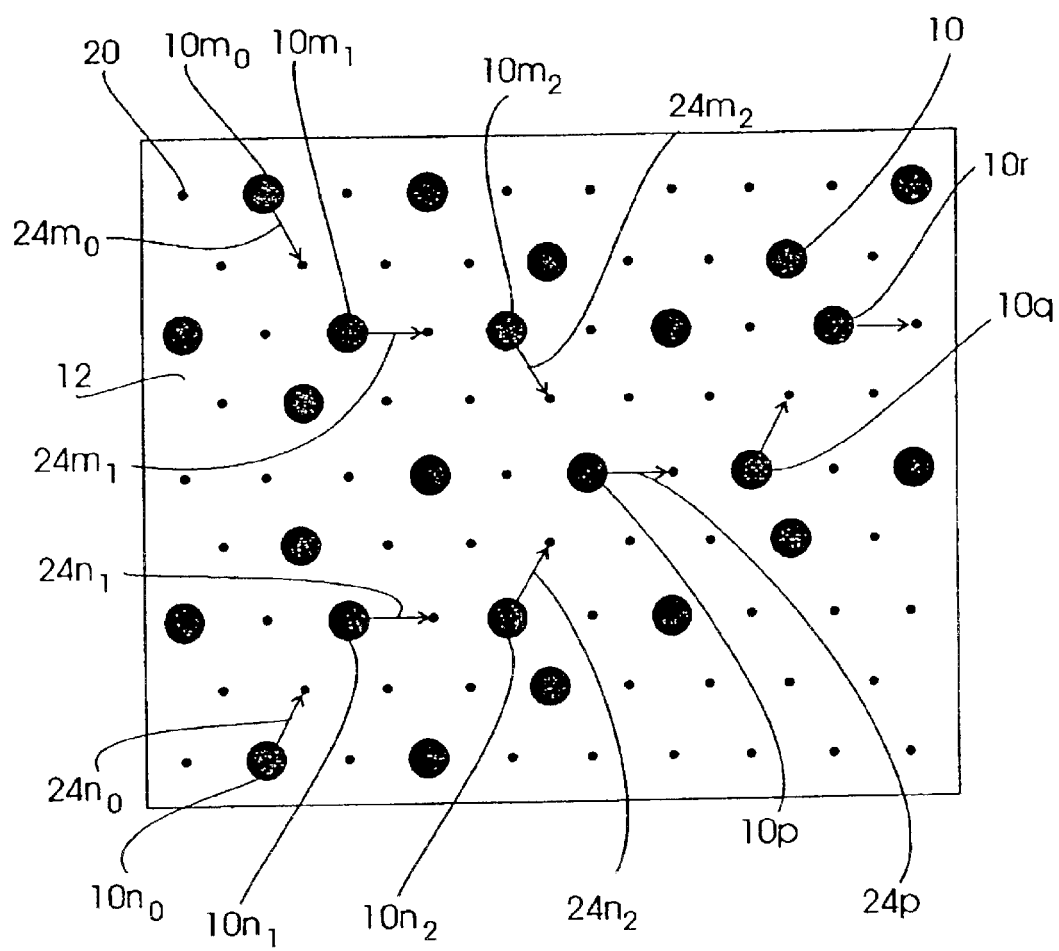
FIGS. 3 and 4 are schematics of molecular arrangements designed to function as AND and OR logic gates, respectively.

The molecules 10 can be arranged so that the resulting cascades serve as logic gates. FIG. 3 shows one such embodiment corresponding to a logic AND gate, in which the inputs and outputs are linked-chevron cascades. The arrangement shown in FIG. 3 consists of two input arms corresponding to respective chevron cascades triggered by respective molecules $10m_0$ and $10n_0$. As indicated by the arrows $24m_0$, $24m_1$, and $24m_2$, movement of the molecule $10m_0$ produces a cascade that includes the movement of molecules $10m_1$ and $10m_2$. Likewise, in the other arm, movement of the molecule $10n_0$ results in movement of the molecules $10n_1$ and $10n_2$, as indicated by the arrows $24n_1$ and $24n_2$. (Movement of the molecules $10m_0$ and $10n_0$ as well as that of other molecules acting as inputs to the structures disclosed herein, may be initiated by dragging them with the tip of an STM.) The molecule designated by $10p$ moves if and only if both of molecules $10m_2$ and $10n_2$ move to sites adjacent to the site occupied by molecule $10p$ in FIG. 3. Thus, the arrangement shown in FIG. 3 functions as an AND gate, in which the core element of the AND gate is the chevron trimer defined by the molecules $10m_2$, $10n_2$, and $10p$—the central molecule $10p$ becomes part of a chevron if and only if cascades have propagated along both input arms. After the molecule $10p$ hops to an adjacent site as indicated by the arrow $24p$, the molecules designated $10q$ and $10r$ move in turn along their respective output arm, thereby propagating the information generated by the AND gate.

Figure 4:
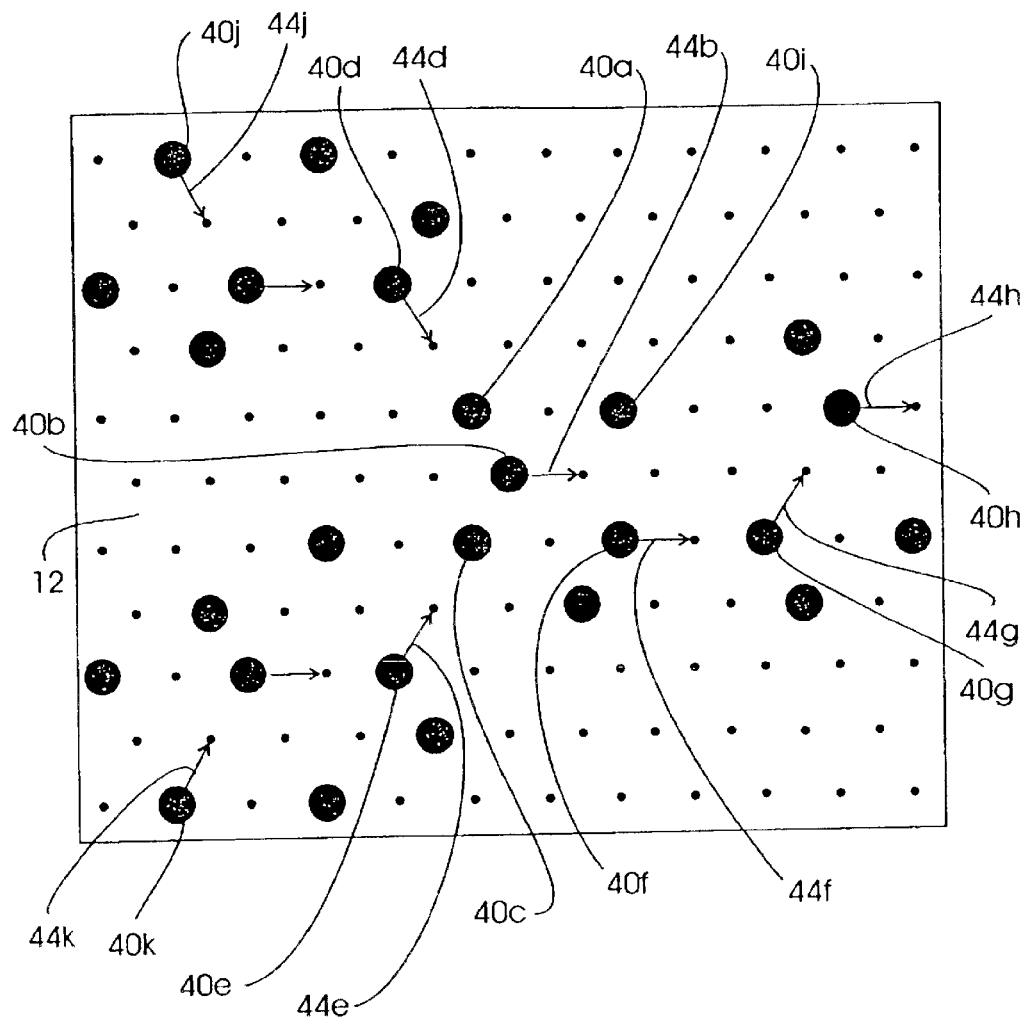

FIG. 4 illustrates how the molecules 10 can be disposed on the surface 12 of the crystal 16 to form an OR gate. The central chevron defined by the three molecules designated 40a, 40b, 40c is stable unless one of the molecules 40d, 40e moves toward this chevron as indicated by the respective arrows 44d, 44e. When either of the molecules 40d or 40e (or both of them) move as indicated in FIG. 4, the molecule 40b in the central chevron moves to the right as indicated by the arrow 44b. This in turn triggers a cascade involving the molecules 40f, 40g, and 40h in the direction indicated by their respective arrows 44f, 44g, and 44h. In this configuration, the central chevron (given by the molecules 40a, 40b, and 40c) does not spontaneously decompose (in the absence of movement by either the molecule 40d or 40e), since the molecules 40f and 40i provide an energy barrier that is sufficiently high to inhibit the motion indicated by the arrow 44b. Once either of the molecules 40d and 40e move (as indicated by the respective arrows 44d, 44e), this energy barrier is overcome, and the cascade involving the molecules 40b, 40f, 40g, and 40h proceeds. As illustrated in FIG. 4, the molecules 40d and 40e correspond to different input arms of the layout, and cascades along these arms may be induced by moving the molecules 40j and 40k, respectively (as illustrated by the arrows 44j and 44k).

Figure 5:
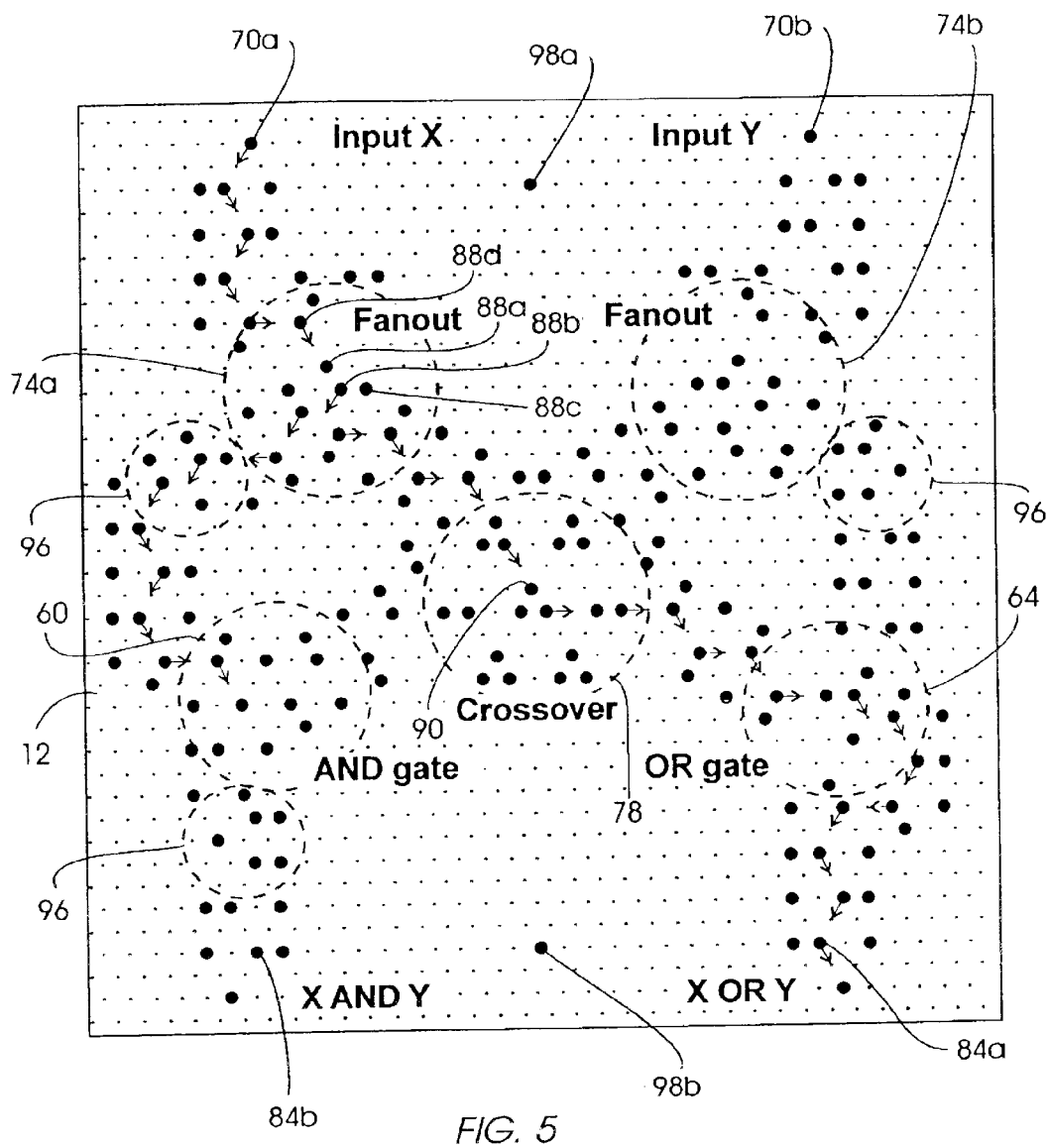
FIGS. 5 and 6 are schematics of more complicated molecular arrangements designed to accept 2 inputs.
Figure 6:
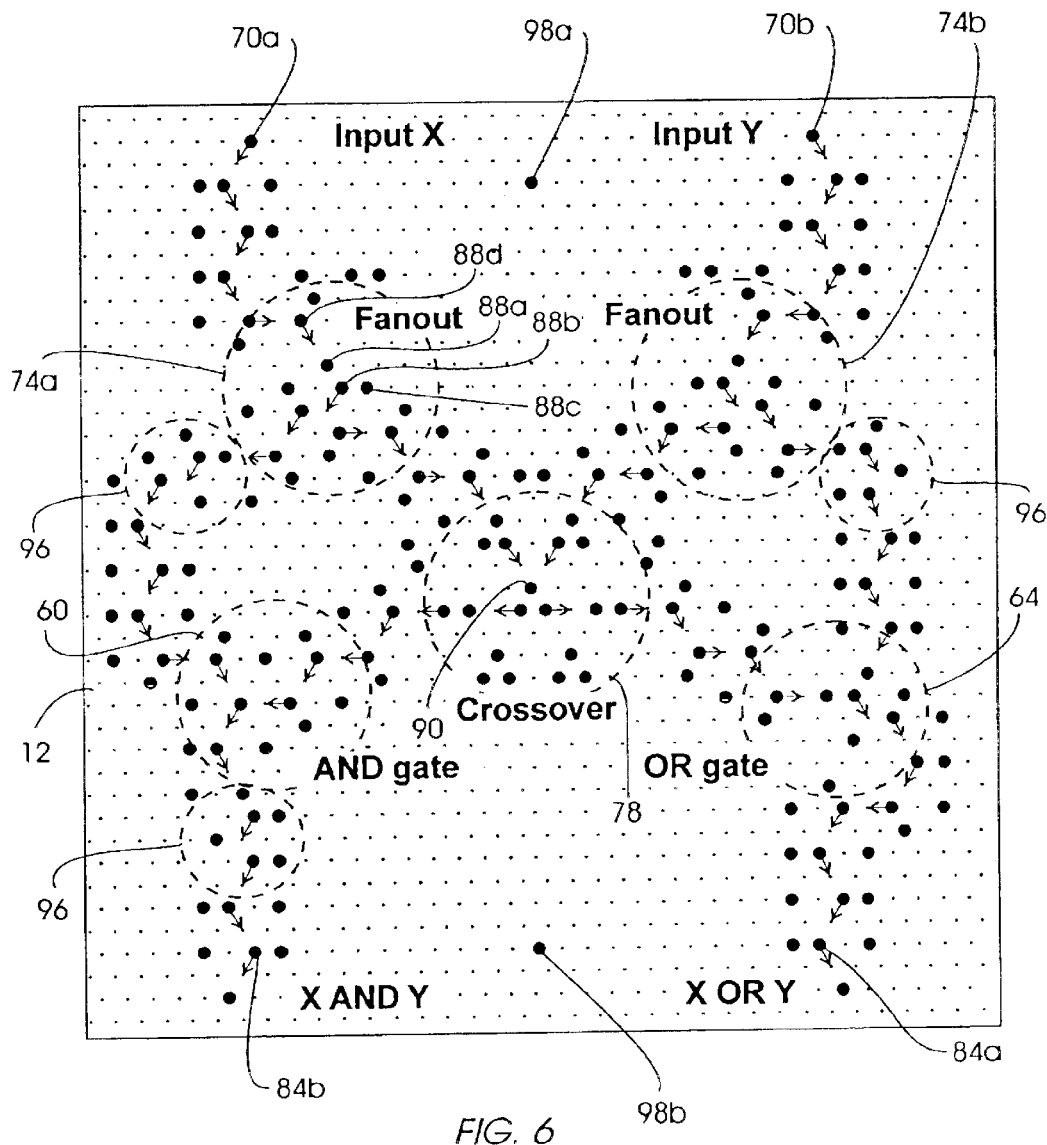

More complicated structures can be assembled as illustrated with respect to FIGS. 5 and 6, which show an arrangement of molecules that includes an AND gate 60 (like the one shown in FIG. 3) as well as an OR gate 64 (like the one shown in FIG. 4). The structure of FIGS. 5 and 6 includes two input arms having respective molecules 70a, 70b for providing respective inputs designated as "Input X" and "Input Y". That is to say, Input X may be provided by moving the molecule 70a as shown in FIG. 5, whereas Input Y is provided by moving the molecule 70b as shown in FIG. 6.

The input arms corresponding to the molecules 70a and 70b include respective fanouts 74a and 74b, each of which acts to direct an incoming cascade into two different directions, as illustrated in FIGS. 5 and 6. The fanouts 74a and 74b, and thus the two input arms, are tied together through a crossover 78. The crossover 78 directs the Input X passing through the fanout 74a to the OR gate 64, while also directing the Input Y passing through the fanout 74b to the AND gate 60. The combination of the fanouts 74a, 74b and the crossover 78 ensures that each of (i) the Input X initiated by the movement of the molecule 70a and (ii) the Input Y initiated by the movement of the molecule 70b are inputted to both the AND gate 60 and the OR gate 64. As shown in FIG. 5, a molecule 84a in an "X OR Y" output arm moves in response to movement of the input molecule 70a. (As indicated in FIG. 6, the molecule 84a will also move in response to movement of the input molecule 70b.) FIG. 6 shows that a molecule 84b in an "X AND Y" output arm moves in response to movement of both input molecules 70a and 70b.

The fanouts 74a, 74b illustrated in FIGS. 5 and 6 include a chevron that is stabilized in the initial, preset configuration. The stabilized chevron of fanout 74a is defined by molecules 88a, 88b, and 88c. When a fourth molecule 88d in the cascading input arm moves towards this chevron, the result of the hop of the molecule 88b is two "overlapping" chevrons that share a molecule, namely, the molecule 88b (in its new position). Each of these two chevrons then decays and activates its respective output cascade, as shown in FIGS. 5 and 6.

The crossover 78 is more complex and uses the decay of clusters of three and four molecules, with these clusters being different from the previously described chevrons. A molecule 90 at the center of the crossover 78 does not itself hop but rather transmits information through the crossover. The fanouts 74a and 74b, the crossover 78, the AND gate 60, and the OR gate 64 are connected by chevrons as well as by alignment units 96 that provide (see FIGS. 5 and 6) the small lateral shifts needed to connect the various components. Correct operation of the crossover 78, the fanouts 74a, 74b and the OR gate 64 (but not the AND gate) requires orienting them with respect to the second-layer Cu atoms (whose position is indicated in FIG. 1A).

The arrays of FIGS. 5 and 6 (as well as the other particle arrangements herein) may be constructed by using an STM to drag and position the particles 10 to desired locations on the surface 12 of the crystal 16. Proper positioning of the particles 10 may be facilitated through the use of propositioned particles 98a and 98b (see FIGS. 5 and 6) that help to define particular rows of lattice sites 20 on the surface 12. Still more complicated structures, such as 3 input sorters, may also be constructed using these techniques.

Conventional logic design relies on the use of a NOT gate or other inverting gate. However, implementing a NOT gate with a single cascade comprising an input portion and an output portion would require that all the molecules in the output portion of the cascade "untopple" (in analogy with dominoes) when the input portion of the cascade toppled. This is not possible here since the untoppled state has higher energy than the toppled state.

Alternatively, the need for a NOT gate can be avoided by representing information with the dual-rail convention that is employed in some self-timed logic designs (see, for example, C. L. Seitz in *Introduction to VLSI systems*, C. A. Mead and L. A. Conway, eds., pp. 218–262, Addison-Wesley, Reading, 1980). Using the dual-rail convention in this context, every bit of information B may be represented by two cascades: one of them (denoted here as $B^0$) topples to represent that B=0 and the other (denoted here as $B^1$) topples to represent that B=1. Given inputs in such a dual cascade configuration, any logic function can be computed in a straightforward way using only AND gates and OR gates. For example, a dual-rail NAND gate that computes C=NOT (A AND B) can be implemented by a single-rail AND gate and a single-rail OR gate as follows:

$$C^0 = A^1 \text{ AND } B^1$$
$$C^1 = A^0 \text{ OR } B^0$$

Furthermore, it is possible to compute the NOT function using a two-input device in which one input (a "CLOCK" cascade) is known to arrive at the gate after another input (the DATA cascade). The DATA cascade functions as an interrupter of the CLOCK cascade; thus, after the CLOCK cascade arrives, the output becomes the logical NOT of DATA.

After a cascade structure is used, the molecules are reset to their original positions before the cascade can be used again. This can be done, for example, by resetting the molecules one at a time with the tip of the STM. The linked chevron cascades (FIG. 2) and the AND gates (FIG. 3) were stable in their initial configurations, showing no evidence of either spontaneous, premature hops or a failure to hop as intended, even after hundreds of hours of testing involving more than 5000 hops. (This is attributed to the existence of restoring forces that urge the molecules 10 to their equilibrium positions at the lattice sites 20; when these restoring forces are overcome, a cascade may develop, as described herein.) However, the more complicated structures (the fanout 74a, 74b, the OR gate 64, and the crossover 78 shown in FIGS. 5 and 6) occasionally produced premature or unintended hops. By contrast, the final configurations (i.e., after a cascade has taken place) were relatively very stable with respect to disturbing influences such as thermal noise and stray fields and currents.

The invention may be embodied in other specific forms without departing from its spirit or essential characteristics. The described embodiments are to be considered in all respects only as illustrative and not restrictive. The scope of the invention is therefore indicated by the appended claims rather than the foregoing description. All changes within the meaning and range of equivalency of the claims are to be embraced within that scope.

What is claimed is:

1. An array of discrete, microscopic particles that are initially in a substantially fixed spatial relationship with respect to each other and with respect to a matrix that acts as a host material for holding the particles, wherein:

each of said particles includes at least one atom, said array including at least first, second, and third ones of said particles; and said particles are arranged to perform a logic computation, so that in response to at least one of said first and said second particles being urged into a lower potential energy state, movement of said third particle is induced as a result of at least one of i) physical interaction between said first particle and said third particle and ii) physical interaction between said second particle and said third particle.

2. The array of claim 1, wherein movement of said third particle is induced as a result of i) physical interaction between said first particle and said third particle and ii) physical interaction between said second particle and said third particle, said array of discrete particles forming an AND gate.

3. The array of claim 1, wherein said array of discrete particles forms an OR gate.

4. The array of claim 1, wherein:

movement of said first particle is induced as a result of moving a fourth particle in said array, in which said fourth particle physically interacts with said first particle; and movement of said second particle is induced as a result of moving a fifth particle in said array, in which said fifth particle physically interacts with said second particle.

5. The array of claim 1, wherein said particles are molecules.

6. The array of claim 5, wherein said molecules are arranged on a surface of said matrix.

7. The array of claim 1, further comprising additional particles whose presence in said array acts to induce movement of said third particle more quickly than would occur in the absence of said additional particles.

8. The array of claim 1, wherein said particles are diatomic molecules.

9. The array of claim 1, wherein said particles include carbon monoxide molecules.

10. The array of claim 1, wherein not all of said particles move while the logic computation is performed.

11. The array of claim 1, wherein said third particle moves translationally across a surface of said matrix.

12. The array of claim 1, wherein said particles are arranged on a surface of said matrix, and wherein said particles hop from one site on said surface to an adjacent site on said surface.

13. The array of claim 1, wherein said array is configured so that motion of said particles represents information.

14. The array of claim 1, wherein movement of said third particle induces movement of other particles in said array in a sequential fashion.

15. The array of claim 1, wherein the chemical structure of said particles remains unaltered as they move.

16. The array of claim 1, said particles including molecular dimers.

17. The array of claim 1, said particles including molecular trimers.

18. The array of claim 1, said particles comprising input arms that provide respective inputs to said array.

19. The array of claim 1, wherein said array includes particles arranged in a fanout configuration.

20. The array of claim 1, wherein said array includes particles arranged in a crossover configuration.

21. The array of claim 1, wherein said particles can be positioned with a scanning tunneling microscope.

* * * * *